United States Patent
Sommer et al.

(10) Patent No.: US 11,981,408 B2
(45) Date of Patent: May 14, 2024

(54) METHOD AND DEVICE FOR DATA TRANSMISSION ON BOARD A WATERCRAFT

(71) Applicants: ThyssenKrupp Marine Systems GmbH, Kiel (DE); thyssenkrupp AG, Essen (DE)

(72) Inventors: Martin Sommer, Hamburg (DE); Leonard Fisser, Hamburg (DE)

(73) Assignees: ThyssenKrupp Marine Systems GmbH, Kiel (DE); thyssenkrupp AG, Essen (DE)

( * ) Notice: Subject to any disclaimer, the term of this patent is extended or adjusted under 35 U.S.C. 154(b) by 574 days.

(21) Appl. No.: 17/267,536

(22) PCT Filed: Aug. 30, 2019

(86) PCT No.: PCT/EP2019/073196
§ 371 (c)(1),
(2) Date: Feb. 10, 2021

(87) PCT Pub. No.: WO2020/048884
PCT Pub. Date: Mar. 12, 2020

(65) Prior Publication Data
US 2021/0316829 A1    Oct. 14, 2021

(30) Foreign Application Priority Data

Sep. 5, 2018    (DE) .................... 10 2018 215 086.9

(51) Int. Cl.
*B63B 79/40*    (2020.01)
*G05B 19/042*   (2006.01)
*H04B 3/54*     (2006.01)

(52) U.S. Cl.
CPC ............ *B63B 79/40* (2020.01); *G05B 19/042* (2013.01); *H04B 3/542* (2013.01); *H04B 3/548* (2013.01);
(Continued)

(58) Field of Classification Search
CPC .................. B63B 79/40; G05B 19/042; G05B 2219/2637; H04B 3/542; H04B 3/548; H04B 2203/5445; H04B 2203/547
See application file for complete search history.

(56) References Cited

U.S. PATENT DOCUMENTS 5,349,644 A    9/1994    Massey
5,973,610 A    10/1999   Jensen
(Continued)

FOREIGN PATENT DOCUMENTS

DE    10 2017 008 235 A    10/2018
KR    100927817 B1         11/2009
(Continued)

OTHER PUBLICATIONS

English Translation of International Search Report issued in PCT/EP2019/073196, dated Nov. 13, 2019.

*Primary Examiner* — Kim T Nguyen
(74) *Attorney, Agent, or Firm* — thyssenkrupp North America, LLC

(57) ABSTRACT

A method and a device can be used to transmit data onboard a watercraft using an onboard power supply network. A central control unit generates an instruction for a first consumer module. The instruction is transmitted from the central control unit via a first control unit-head station data connection to a first head station. The first head station converts the instruction into an instruction signal that is transmittable via the power supply network. The instruction signal is transmitted from the first head station via a first (Continued)

head station-power line data connection, the power supply network, and a first coupling module-power line data connection to a first coupling module. From the instruction signal, the first coupling module again generates an instruction that can be transmitted via a data connection. The instruction is transmitted from the first coupling module via a first coupling module-consumer data connection to the first consumer module.

16 Claims, 4 Drawing Sheets

(52) U.S. Cl.
CPC ............... *G05B 2219/2637* (2013.01); *H04B 2203/5445* (2013.01)

(56) References Cited

U.S. PATENT DOCUMENTS

| | | |
|---|---|---|
| 6,273,771 B1 * | 8/2001 | Buckley ............... B63H 21/213 |
| | | 114/144 RE |
| 2006/0271970 A1 | 11/2006 | Mitchell |
| 2009/0156159 A1 | 6/2009 | Lim |
| 2017/0369135 A1 * | 12/2017 | Grace ..................... G07C 5/02 |
| 2018/0287666 A1 | 10/2018 | Kornek-Percin |

FOREIGN PATENT DOCUMENTS

| | | |
|---|---|---|
| WO | 94/01949 A | 1/1994 |
| WO | 01/13186 A | 2/2001 |

* cited by examiner

METHOD AND DEVICE FOR DATA TRANSMISSION ON BOARD A WATERCRAFT

CROSS REFERENCE TO RELATED APPLICATIONS

This application is a U.S. National Stage Entry of International Patent Application Serial Number PCT/EP2019/073196, filed Aug. 30, 2019, which claims priority to German Patent Application No. DE 10 2018 215 086.9, filed Sep. 5, 2018, the entire contents of both of which are incorporated herein by reference.

FIELD

The present disclosure generally relates to methods and devices for data transmission onboard watercraft using onboard power supply networks.

BACKGROUND

A data exchange via a power supply network having AC power lines is described in WO 94/01949 A2. The methods and devices described there can be used, for example, on board a warship.

Thus a need exists for a watercraft and a method where the electrical components of watercrafts can be connected and maintained with less effort than in the case of known watercraft and methods.

DETAILED DESCRIPTION

Figure 1:
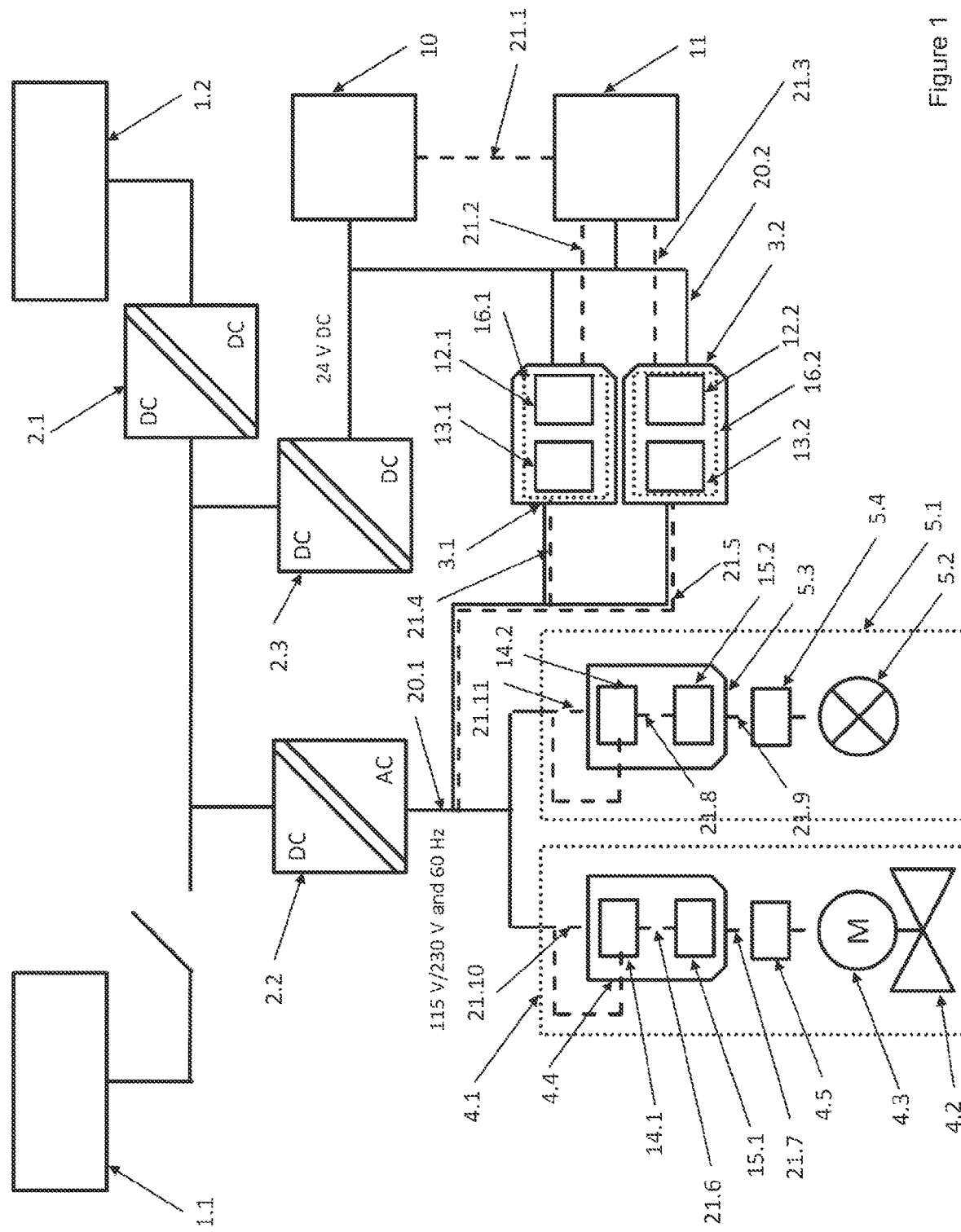
FIG. 1 is a circuit diagram for a section of a network, wherein the section comprises a central control unit, two head stations, two coupling modules, and two consumer modules.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The watercraft according to the invention comprises:
a first electrical consumer module,
a central control unit,
a power supply network, and
a data connection system.

The data connection system comprises:
a first head station,
a first coupling module,
a first control unit-head station data connection,
a first head station-power line data connection,
a first coupling module-power line data connection, and
a first coupling module-consumer data connection.

The first control unit-head station data connection at least temporarily provides a data connection between the central control unit and the first head station. The first head station-power line data connection at least temporarily provides a data connection between the first head station and the power supply network. The first coupling module-power line data connection at least temporarily provides a data connection between the first coupling module and the power supply network. The first coupling module-consumer data connection at least temporarily provides a data connection between the first coupling module and the first electrical consumer module.

The power supply network is capable of supplying electricity to the first consumer module. The central control unit is capable of automatically generating an instruction for the first consumer module. The watercraft is capable of transmitting this instruction from the central control unit automatically to the first consumer module. The first consumer module can be controlled externally and is capable of automatically processing the received instruction.

The watercraft is capable of transmitting the instruction from the central control unit to the first consumer module in the following manner:
  The instruction is transmitted from the central control unit via the first control unit-head station data connection to the first head station.
  The first head station converts the instruction which was transmitted via this data connection into an instruction signal. This instruction signal can be transmitted via the power supply network.
  The instruction is transmitted in the form of the instruction signal from the first head station to the first coupling module in the following manner: from the first head station via the first head station-power line data connection, via the power supply network and via the first coupling module-power line data connection to the first coupling module.
  From the instruction signal, the first coupling module again generates an instruction which can be transmitted via a data connection.
  The instruction is transmitted from the first coupling module via the first coupling module-consumer data connection to the first electrical consumer module.

The power supply network is therefore connected in a first connection point to the first head station and in a second connection point to the first coupling module. A physical distance occurs between these two connection points. The two connection points are electrically interconnected by means of the power supply network.

The term "data connection" refers to a connection which is suitable for transmitting data, but is not necessarily suitable for supplying an electrical consumer with power. A data connection of this type is normally implemented by means of a special data line or a wireless data connection. The data connection can be a point-to-point connection or a data connection to which a plurality of transmitters and/or receivers are connected, for example a data bus.

According to the solution, a command is transmitted only partially via special data connections from the central control unit to the first consumer module. Conversely, the command is transmitted partially via the power supply network via which the first consumer module and, if required, further consumer modules and also the central control unit and the data connection system devices are supplied with power.

According to the solution, the power supply network therefore performs two tasks: power supply and additionally data transmission. Thanks to this feature, fewer special data connections are required. One special data connection is required in each case between the central control unit and the first head station and between the first coupling module and the first consumer module, but not between the first head station and the first coupling module. Instead, the power supply network connects the first head station to the first coupling module and provides a data transmission channel.

The invention can be used, in particular, with particularly substantial benefit if a relatively long distance occurs between the central control unit and the first consumer module. Thanks to the invention, it is possible to arrange the first head station physically close to the central control unit, and the first coupling module physically close to the first consumer module. As a result, the special data connections in each case need to bridge a relatively short distance only.

This enables the first consumer module and the first coupling module to be designed as components of a first assembly. This first assembly can be connected, preferably detachably, to the power supply network. A data transmission from the central control unit to the first consumer module is simultaneously enabled by connecting this first assembly to the power supply network. There is no need to set up a special data connection in addition to the connection of the assembly to the power supply network. In particular, no additional cabling is required. The invention therefore reduces the manual effort required to connect the first consumer module. Furthermore, fewer coupling points, in particular fewer plug-in connectors, are required in order to connect the first consumer module to both the power supply network and the central control unit.

A further advantage of the invention is as follows: thanks to the first head station and the first coupling module according to the solution, the central control unit and the first consumer module can be implemented regardless of whether the data transmission is performed exclusively via special data connections or partially via special data connections and partially via the power supply network. In particular, there is no need to adapt the central control unit or a consumer module to a data transmission via a power supply network. The invention therefore results in fewer restrictions in the design of the first head station and the first coupling module.

According to the solution, the instruction is transmitted from the first head station to the first coupling module via the power supply network. A frequency for a data transmission is preferably modulated here onto the power supply network and a data transmission channel is thereby provided on the power supply network without requiring a special data connection. The frequency for the data transmission on the power supply network is preferably below 1 MHz, particularly preferably below 500 kHz. This design results in a relatively low electromagnetic radiation, which is often unwanted, particularly on board a watercraft.

According to the solution, the instruction is transmitted partially via the power supply network and partially via special data connections from the central control unit to the first consumer module. In one design, the power supply network is grounded, i.e. electrically connected to the ground of the watercraft, thereby providing a reference voltage potential, in particular a zero potential. Fault current monitoring automatically ensures that a crew member of the watercraft is never at risk, even if this crew member has touched the power supply network. Conversely, thanks to the invention, the special data connections can be designed as ungrounded data connections. Thanks to the connection to the voltage supply network, a reference voltage potential is nevertheless provided. This design enables automatic fault current monitoring to be ensured and the isolations to be remotely monitored for the entire data connection.

According to the solution, an instruction can be transmitted from the central control unit to the first electrical consumer module. In one design, the first consumer module is capable of automatically generating a message and the central control unit is capable of automatically processing this message. This message can be transmitted from the first consumer module to the central control unit, wherein the power supply network is similarly used for this purpose. In order to transmit the message to the central control unit, the data connection system is used in the opposite direction compared with the transmission of the instruction to the first consumer module. In this design, the components of the data connection system are designed as bidirectional.

The message is transmitted from the first consumer module to the central control unit only partially via a special data connection. According to this design, the message is transmitted from the first consumer module to the central control unit in the following manner:

The message is transmitted from the first consumer module via the first coupling module-consumer data connection to the first coupling module.

The first coupling module converts the message which was transmitted via this data connection into a message signal. This message signal can be transmitted via the power supply network.

The message is transmitted in the form of the message signal from the first coupling module via the first coupling module-power line data connection, the power supply network and the first head station-power line data connection to the first head station.

The first head station again converts the message signal which was transmitted via the power supply network into a message which can be transmitted via a data connection.

This message is transmitted from the first head station via the first control unit-head station data connection to the central control unit.

In one design, the data connection system comprises a second head station which is arranged parallel to the first head station. The data connection system further comprises:
  a second control unit-head station data connection, and
  a second head station-power line data connection.

The second control unit-head station data connection at least temporarily provides a data connection between the central control unit and the second head station. The second head station-power line data connection at least temporarily provides a data connection between the second head station and the power supply network.

According to this design, an instruction can be transmitted from the central control unit not only via the first head station, but also via the second head station to the first consumer module, preferably electively via either the first head station or the second head station. If the second head station is used, the instruction is transmitted in the following manner:

The instruction is transmitted from the central control unit via the second control unit-head station data connection to the second head station.

The second head station converts the instruction which was transmitted via this data connection into an instruction signal. This instruction signal can be transmitted via the power supply network.

The instruction is transmitted in the form of the instruction signal from the second head station to the first coupling module in the following manner: from the second head station via the second head station-power line data connection, via the power supply network and via the first coupling module-power line data connection to the first coupling module.

From the instruction signal, the first coupling module again generates an instruction which can be transmitted via a data connection.

The instruction is transmitted from the first coupling module via the first coupling module-consumer data connection to the first electrical consumer module.

This design provides redundancy. One head station is sufficient to guarantee the data exchange between the central control unit and the first consumer module via the first coupling module. The other head station is on standby and is preferably supplied continuously with power. If the currently used head station fails, the data connection system can automatically switch over rapidly to the other head station. The data exchange is interrupted for a short time only. It is not necessary to set up a data connection or a connection to the power supply network only after the failure of a head station, which takes time.

In one development of this design with the second head station, the data connection system comprises at least one data connection control unit. The or each data connection control unit is capable of automatically operating as follows:

If both the first head station and the second head station are operational, the data connection control unit selects one of these two head stations and activates the selected head station.

If one head station has failed and only the other head station is operational, the data connection control unit activates the other, i.e. the operational, head station.

In both cases, the data connection control unit sets up a first data connection between the central control unit and the first consumer module. This first data connection is set up by incorporating the power supply network, the activated head station and the first coupling module. An instruction and a message can be transmitted via this first data connection.

In one preferred design, the first coupling module and, where appropriate, further coupling modules for further electrical consumer modules register automatically with the head station which is activated or is to be activated. This eliminates the need to store information in each head station in advance indicating which coupling modules are to be connected to this head station. Stored information of this type may be outdated. Instead, the coupling modules which are currently to be connected to the head station which is to be activated or is activated are automatically determined, and this information is stored and updated automatically as required.

In one design, the or each data connection control unit is capable of automatically establishing that the activated head station has failed after the first data connection is set up. In response thereto, the data connection control unit is capable of activating the other head station—but obviously only if the other head station is operational. The or each other data connection control unit is capable of setting up a second data connection between the central control unit and the first consumer module. This second data connection comprises the power supply network, the activated other head station and the first coupling module.

In one design, the first head station comprises a first data connection control unit. The second head station comprises a second data connection control unit. Each data connection control unit is capable of performing the steps described above. In particular, the first data connection control unit is capable of setting up a data connection between the central control unit and the first coupling module by incorporating the first head station.

The second data connection control unit is capable of setting up a further data connection between the central control unit and the second coupling module by incorporating the second head station. This design ensures that, if one head station fails, switchover to the other head station takes place without an external manual or automatic adjustment intervention being required for this purpose. In particular, no adjustment intervention is required on the part of the central control unit in order to switch over to the other, operational head station. Time is thereby saved.

Each data connection control unit is preferably capable of establishing whether the other head station and therefore the other data connection control unit is operational or has failed. If each data connection control unit establishes that the other head station and therefore the other data connection control unit is operational, one head station is selected and activated in accordance with a predefined rule. If one data connection control unit establishes that the other data connection control unit has failed, for example does not respond to a query, this data connection control unit sets up a data connection.

In one design, the watercraft additionally comprises a second electrical consumer module. The data connection system additionally comprises:
  a second coupling module,
  a second coupling module-power line data connection, and
  a second coupling module-consumer data connection.

The second coupling module-power line data connection at least temporarily provides a data connection between the second coupling module and the power supply network. The second coupling module-consumer data connection at least temporarily provides a data connection between the second coupling module and the second electrical consumer module.

The central control unit is capable of generating an instruction for the second consumer module. The second consumer module is capable of automatically processing a received instruction. The watercraft is capable of transmitting this instruction from the central control unit to the second consumer module in the following manner:

The instruction is transmitted from the central control unit via the first control unit-head station data connection to the first head station.

The first head station converts the instruction which was transmitted via this data connection into an instruction signal. This instruction signal can be transmitted via the power supply network.

The instruction is transmitted in the form of the instruction signal from the first head station to the second coupling module in the following manner: from the first head station via the first head station-power line data connection, via the power supply network and via the second coupling module-power line data connection to the second coupling module.

From the instruction signal, the second coupling module again generates an instruction which can be transmitted via a data connection.

The instruction is transmitted from the second coupling module via the second coupling module-consumer data connection to the second electrical consumer module.

According to this design, the same first head station can enable a data transmission from the central control unit to a plurality of parallel-arranged electrical consumer modules in each case via an assigned coupling module.

This design with the second electrical consumer module can be combined with the design in which a, preferably redundant, second head station is provided parallel to the first head station. The instruction from the central control unit to the second consumer module is then transmitted via either the first head station or the second head station.

The first consumer module and the first coupling module are preferably designed as components of a first assembly. This first assembly can be detachably connected to the power supply network. By connecting the first assembly to the power supply network, a data connection is simultaneously enabled between the first consumer module and the central control unit, wherein this data connection uses the power supply network. The second consumer module and the second coupling module can be designed accordingly as a component of a second assembly.

In one design, the first consumer module comprises a local control unit and a first electrical consumer. The first coupling module-consumer data connection at least temporarily sets up a data connection between the first coupling module and the local control unit. An instruction can be transmitted from the central control unit to the local control unit of the first consumer module by means of this data connection. The local control unit is capable of controlling the first electrical consumer, depending on a transmitted instruction from the central control unit. It is possible for the aforementioned first assembly to comprise the first electrical consumer and the local control unit in addition to the first coupling module.

In one design, the instruction can be transmitted from the central control unit by means of a fieldbus connection to the first consumer module. The data connection system additionally comprises:
a fieldbus master, and
a first fieldbus slave.

The first control unit-head station data connection comprises two individual data connections, i.e.:
a control unit-fieldbus data connection, and
a first fieldbus-head station data connection.

The first coupling module-consumer data connection similarly comprises two individual data connections, i.e.:
a first coupling module-fieldbus data connection, and
a first slave-consumer data connection.

The control unit-fieldbus data connection at least temporarily provides a data connection between the central control unit and the fieldbus master. The first fieldbus-head station data connection at least temporarily provides a data connection between the fieldbus master and the first head station. The first coupling module-fieldbus data connection at least temporarily provides a data connection between the first coupling module and the first fieldbus slave. The first slave-consumer data connection at least temporarily provides a data connection between the first fieldbus slave and the first electrical consumer module.

In this design, a fieldbus connection is provided between the fieldbus master and the first fieldbus slave. This fieldbus connection comprises the following components:
the control unit-fieldbus data connection,
the first fieldbus-head station data connection,
the first head station-power line data connection,
the power supply network or a part of the power supply network via which an instruction signal can be transmitted,
the first coupling module-power line data connection, and
the first coupling module-fieldbus data connection.

According to this design, an instruction is transmitted from the central control unit to the first consumer module in the following manner:

The instruction is transmitted from the central control unit via the control unit-fieldbus data connection to the fieldbus master.

The fieldbus master converts an instruction which was transmitted via this data connection into a fieldbus instruction. This is an instruction which can be transmitted via a fieldbus connection.

This fieldbus instruction is transmitted via the provided fieldbus connection from the fieldbus master to the first fieldbus slave. The components which this provided fieldbus connection has were listed in the previous paragraph. The fieldbus connection uses the power supply network.

The first fieldbus slave converts the fieldbus instruction which was transmitted via this fieldbus connection into an instruction which can be transmitted via a data connection which is not necessarily a fieldbus connection.

This instruction is transmitted from the first fieldbus slave via the first slave-consumer data connection to the first electrical consumer module.

A plurality of transmitters and/or a plurality of receivers are normally connected to a fieldbus connection. Along with the payload data, i.e. the actual instruction, a fieldbus instruction therefore comprises information relating to the receiver and optionally relating to the transmitter, and also optionally information relating to the priority of the instruction and optionally further transmission information.

It is possible for a message also to be transmitted from the first consumer module by means of the first fieldbus slave and the fieldbus master and therefore by means of this fieldbus connection to the central control unit.

It is possible for a data connection to be set up between a second fieldbus slave and the second consumer module and also the second coupling module, and for a corresponding fieldbus connection to be set up between the fieldbus master and the second fieldbus slave.

The fieldbus connection of the design can be provided by a fieldbus system. A fieldbus system is a tried and tested procedure with standardized implementations for connecting a central control unit to a controllable electrical consumer module and for enabling a data exchange between these two devices. A fieldbus system removes the need for point-to-point connections between different devices of the watercraft. Standardized fieldbus transmission methods and fieldbus devices which operate according to these standardized transmission methods are available.

A fieldbus system of this type can be implemented irrespective of whether the fieldbus master and the first fieldbus slave are interconnected via a special data line or via a power supply network. According to this design, the fieldbus connection between the fieldbus master and the first fieldbus slave is implemented by means of the power supply network without a data connection necessarily being set up between the fieldbus master or the first fieldbus slave and the power supply network. For the fieldbus connection, it suffices for a data connection to be set up between the fieldbus master and the or each head station and for a data connection to be set up between the first fieldbus slave and the first coupling module.

The fieldbus slave can be integrated into the first coupling module. Alternatively, the first fieldbus slave and the first coupling module together form a first structural unit.

In one design, in addition to the first coupling module and the first consumer module, the first assembly also comprises the first fieldbus slave. This first assembly can be detachably connected to the power supply network, preferably to the part which belongs to the fieldbus connection. The fieldbus connection can be set up without additional cabling by connecting the first assembly to the power supply network.

In one design, data are transmitted between the first head station and the first coupling module exclusively via the power supply network. Conversely, in an alternative design, this data transmission is routed only partially via the power supply network and partially via a special data connection. A signal to be transmitted is removed from the power supply network at a removal point and is fed back into the power supply network at a feed-in point which is spatially distanced from the removal point. This special data connection is used particularly if the power supply network is subdivided into a first part and at least a second part, wherein these two parts are galvanically isolated from one another. The first head station is thereby also galvanically isolated from the first coupling module. The first head station is connected to the first part of the power supply network, and the second coupling module is connected to the second part. The special data connection bridges this galvanic isolation between the two parts and can comprise a special intermediate module.

In one design, the watercraft comprises a first power supply network and a second power supply network. Each power supply network in each case comprises a head station which is connected to the same central control unit, an electrical consumer module and a coupling module which is connected to this consumer module. The invention is implemented in each case at least once in both power supply networks. The central control unit can issue an instruction by means of the first power supply network to a consumer module or by means of the second power supply network to a different consumer module, or can issue the same instruction via both power supply networks to both consumer modules.

In one design, the watercraft comprises at least one voltage source of its own. This voltage source is electrically connected to the power supply network and is capable of supplying electricity via the power supply network to the first electrical consumer module and optionally to further consumer modules which are connected to the power supply network. The watercraft is capable of operating autonomously thanks to this design.

In a different design, the watercraft is connected during operation via a power connection, for example by a power cable, to a further watercraft or to a different external platform and is supplied with electrical energy via this power connection. This design removes the need for a power source on board the watercraft.

In one design, a first energy storage device is assigned to the first consumer module and/or to the first coupling module. This first energy storage device is capable of supplying electricity temporarily to at least the first coupling module or to each module. This first energy storage device is capable of maintaining data communication between the central control unit and the first consumer module even if the first coupling module is temporarily disconnected from the voltage supply network and does not therefore supply the first coupling module with power via the voltage supply network. It is possible for this first energy storage device to supply electricity additionally to a component of the first consumer module, for example to a local control unit. In one embodiment, the first energy storage device comprises a capacitor and a voltage regulator. Thanks to the first energy storage device, there is no need to provide a redundant additional voltage supply for the first consumer module or for the first coupling module. This would require additional cabling. Thanks to the first energy storage device, the energy supply of the first consumer module and/or the first coupling module is nevertheless ensured for a certain time period.

In one design, the first head station is electrically connected to the voltage supply network and additionally to an emergency voltage supply network. This emergency voltage supply network comprises an uninterruptible voltage supply. The situation in which the first head station is no longer supplied from the voltage supply network is preferably detected automatically and a switchover to the emergency voltage supply network with the uninterruptible voltage supply takes place automatically. This design ensures that electricity is supplied to the first head station even if the supply from the voltage supply network fails or is interrupted. It is possible for the first coupling module also to be electrically connected to this emergency voltage supply.

The watercraft according to the solution can be a surface vehicle or an underwater vehicle. The watercraft can have its own drive, for example an electric motor, or can be without its own drive. The first electrical consumer module can comprise any type of electrical consumer which can be externally controlled, in particular a hatch having its own hatch drive, a valve having its own valve drive, a drive mechanism for a movable component of the watercraft, a local control unit, a sensor or an actuator, e.g. a gripper. The electrical consumer module can modify its state, for example the position of a component, in response to receiving the instruction. It is also possible for the electrical consumer module to transmit a sensor value to the central control unit in response to the instruction.

In the example embodiment, the invention is used on board a military surface vessel or an underwater vessel. This watercraft has a multiplicity of electrically driven drive mechanisms, e.g. drive mechanisms for hatches or for valves or for other movable components, and also further electrical consumers, e.g. signal lamps, sensors, control units and also routers and other network components. The or at least some of the electrical consumers are electrically supplied with 115 V or 230 V and 60 Hz AC current or with 24 V DC current according to the NATO standard STANAG 1008 edition 9.

In one design, an on-board source of electrical energy, e.g. a battery system, a fuel cell system or a generator, generates current in a voltage other than that required by the consumers, and a converter, e.g. a rectifier or an inverter, generates the current with the voltage and, where appropriate, with the frequency at which the or some electrical consumers require the power.

A plurality of electrical consumers are combined in each case into a group of electrical consumers. This group of consumers is referred to below as a network segment. Each network segment is galvanically isolated from the main supply network. High-frequency data signals which occur during a data transmission in one network segment are prevented through suitable measures from being injected into a different network segment.

Each network segment comprises a plurality of consumer assemblies. Each consumer assembly in each case comprises at least one electrical consumer, e.g. a final control element or a signal lamp, optionally a local control unit and a coupling module which is explained below. Each consumer assembly can be connected and exchanged independently from any other consumer assembly. Each consumer assembly is connected to the on-board power supply network and is thereby supplied with power in the required voltage. The coupling module comprises a detachable electrical connection, e.g. an electrical plug-in connector which can be inserted into a corresponding socket, or conversely a socket for a plug-in connector.

Each network segment further comprises two parallel-arranged and redundantly designed head stations. Each head station alone is capable of performing the entire work described below for the network segment on its own. In the example embodiment, each consumer assembly preferably further comprises a storage device for electrical energy. This energy storage device increases operational reliability in the event of an interruption in the voltage supply, as will be explained below.

A section of the on-board power supply network is shown by way of example in FIG. 1
- shows a circuit diagram for a section of the network, wherein the section comprises a central control unit, two head stations, two coupling modules and two consumer modules;

This section shows, by way of example, a network segment having two parallel-arranged consumer assemblies. The following components are shown:
- two parallel-arranged voltage sources 1.1 and 1.2 which supply DC voltage in the example embodiment, wherein the first voltage source 1.1 is currently disconnected from the network,
- a first DC voltage converter 2.1 which converts DC current from the voltage source 1.2,
- a second voltage converter 2.2 which converts DC current from the first voltage source 1.1 or from the first DC voltage converter 2.1 into AC current at 115 or 230 V and 60 Hz,
- a third DC voltage converter 2.3 which converts DC current from the first voltage source 1.1 or from the first DC voltage converter 2.1 into DC current at 24 V,
- two parallel-arranged head stations 3.1 and 3.2,
- a first consumer assembly 4.1 having a hatch 4.2, a drive mechanism 4.3 for the hatch 4.2, a first coupling module 4.4, a first local control unit 4.5 and a first energy storage device (not shown),
- a second consumer module 5.1 having a signal lamp 5.2, a second coupling module 5.3, a second local control unit 5.4 and second energy storage device (not shown),
- a central control unit 10 which is responsible for this network segment and preferably for at least one further network segment, and
- a fieldbus master 11 which is responsible for the network segment with the two consumer assemblies 4.1 and 5.1.

Each head station 3.1, 3.2 in each case comprises one PLC coordinator 16.1, 16.2. PLC means "Power Line Communication". Each PLC coordinator 16.1, 16.2 in each case comprises one PLC control unit 12.1, 12.2 and one PLC modem 13.1, 13.2. Each coupling module 4.4, 5.3 in each case comprises one PLC client 14.1, 14.2 and one fieldbus slave 15.1, 15.2.

FIG. 1 shows a circuit diagram for a section of the network, wherein the section comprises a central control unit, two head stations, two coupling modules and two consumer modules;
shows the following components of a data connection system:
- the fieldbus master 11,
- the first head station 3.1 having the first PLC coordinator 16.1,
- the second head station 3.2 having the second PLC coordinator 16.2,
- the first coupling module 4.4 having the first PLC client 14.1 and the first fieldbus slave 15.1,
- the second coupling module 5.3 having the second PLC client 14.2 and the second fieldbus slave 15.2,
- a control unit-fieldbus data connection 21.1 which connects the central control unit 10 to the fieldbus master 11,
- a first fieldbus-head station data connection 21.2 which connects the fieldbus master 11 to the first PLC coordinator 16.1 and is designed as a fieldbus connection,
- a second fieldbus-head station data connection 21.3 which connects the fieldbus master 11 to the second PLC coordinator 16.2 and is designed as a fieldbus connection,
- a first head station-power supply network data connection 21.4 which connects the first PLC coordinator 16.1 to the first part 20.1 of the power supply network and is designed as a fieldbus connection,
- a second head station-power supply network data connection 21.5 which connects the second PLC coordinator 16.2 to the first part 20.1 of the power supply network and is designed as a fieldbus connection,
- a first coupling module-fieldbus data connection 21.6 which connects the first PLC client 14.1 to the first fieldbus slave 15.1 and is designed as a fieldbus connection,
- a first slave-consumer data connection 21.7 which connects the first fieldbus slave 15.1 to the first local control unit 4.5,
- a second coupling module-fieldbus data connection 21.8 which connects the second PLC client 14.2 to the second fieldbus slave 15.2 and is designed as a fieldbus connection,
- a second slave-consumer data connection 21.9 which connects the second fieldbus slave 15.2 to the second local control unit 5.4,
- a first coupling module-power line data connection 21.10 which connects the PLC client 14.1 to the first part 20.1 of the power supply network, and
- a second coupling module-power line data connection 21.11 which connects the PLC client 14.2 to the first part 20.1 of the power supply network.

In FIG. 1 shows a circuit diagram for a section of the network, wherein the section comprises a central control unit, two head stations, two coupling modules and two consumer modules;
electrical connections which are used for the voltage supply are shown with continuous lines and data connections are shown with dashed lines. The second voltage source 1.2 supplies the electrical consumers 4.3 and 5.2, the central control unit 10, the fieldbus master 11, the two head stations 3.1 and 3.2 and also the two coupling modules 4.4 and 5.3 and the two local control units 4.5, 5.4 with the respectively required power.

The two head stations 3.1 and 3.2 are arranged parallel to one another. If both head stations 3.1 and 3.2 are operational, one head station is active and the other head station is on standby. In the following description, the first head station 3.1 is the active head station, unless otherwise indicated.

The central control unit 10 is capable of controlling each electrical consumer 4.3 and 5.2 and, conversely, of receiving and processing status messages from the electrical consumers 4.3 and 5.2. Data are thus transmitted in both directions between the central control unit 10 and the electrical consumers 4.3 and 5.2. The central control unit 10 is connected via a data bus at least to the or each fieldbus master 11. In the example embodiment, data are transmitted according to a fieldbus standard.

The energy storage device of the first consumer assembly 4.1 ensures a data transmission between the central control unit 10 and the local control unit 4.5 even if the central voltage supply of the first consumer assembly 4.1 from a voltage source 1.1 or 1.2 is suddenly interrupted. The first energy storage device supplies at least the first coupling module 4.4 and the first local control unit 4.5 for the normal duration of a voltage interruption. The energy storage device thereby prevents an interruption of the data transmission and contributes to critical system stability. The second energy storage device correspondingly supplies at least the second coupling module 5.3 and the second local control unit 5.4 for the duration of the interruption.

According to the solution, data are not transmitted between the central control unit 10 and an electrical consumer 4.3 and 5.2 exclusively via special data lines, but instead via a part of the transmission path by means of electrical connections of the power supply network (Power Line Communication, PLC). The two head stations 3.1 and 3.2 are therefore not connected to the coupling modules 4.1 and 5.1 of this network segment via special data lines, but instead only via power lines of the on-board power supply network through which AC current flows in the example embodiment. It is also possible to use power lines for DC current. Since the electrical connections that are used for the power supply are used for the power supply and additionally for data transmission, the need to install special data lines is avoided. This reduces the cabling outlay and the number of required plug-in connectors and sockets, since only one plug-in connector/socket combination needs to be provided for power and for data.

In one design, the G3-PLC method is used which has been standardized under the designation ITU-T G.9903. The frequency at which data are transmitted via power connections is so low in the example embodiment that an unwanted radiation of radio waves is minimized and the data transmission rate is nevertheless sufficiently high. It is preferably below 500 kHz. The data transmission via the power connections is furthermore also carried out according to a fieldbus standard. The transmission by means of a fieldbus standard can likewise be used for data transmission by means of special signal cables and for data transmission via power cables of the power supply network.

FIG. 1 shows a circuit diagram for a section of the network, wherein the section comprises a central control unit, two head stations, two coupling modules and two consumer modules;

shows, by way of example, a plurality of hierarchically arranged components of the data network, i.e.:
- the central control unit 10 which, in the example embodiment, is responsible for all network segments,
- the fieldbus master 11 which is responsible for at least one network segment,
- the PLC coordinator 16.1 of the currently active first head station 3.1,
- the PLC client 14.1 of the first coupling module 4.4,
- the fieldbus slave 15.1 of the first coupling module 4.4,
- a first local control unit 4.5 which controls the drive mechanism 4.3 for the hatch 4.2 and belongs to the first consumer assembly 4.1,
- the drive mechanism 4.3, and
- the hatch 4.2.

The central control unit 10 generates adjustment commands for the controllable electrical consumers in order to e.g. open a hatch or valve or activate or poll a sensor. Conversely, the central control unit 10 receives status messages from consumers, e.g. the setting of a hatch or valve, an acknowledgement from a final control element or a sensor value. The central control unit 10 operates largely independently from the data transmission methods that are used.

The fieldbus master 11 converts an instruction received from the central control unit 10 into a fieldbus instruction and, conversely, converts a received fieldbus message into a message to the central control unit 10.

FIG. 1 shows a circuit diagram for a section of the network, wherein the section comprises a central control unit, two head stations, two coupling modules and two consumer modules;

shows, by way of example, how an instruction is transmitted from the central control unit 10 to the local control unit 4.5 in order to cause the drive mechanism 4.3 to move the hatch 4.2. Conversely, a message is transmitted from the local control unit 4.5, e.g. the achieved setting of the hatch 4.2, to the central control unit 10. FIG. 1 shows a circuit diagram for a section of the network, wherein the section comprises a central control unit, two head stations, two coupling modules and two consumer modules;

shows the commands that are transmitted via a power line with continuous lines, the commands that are transmitted via a fieldbus data connection with dashed lines, and the commands that are transmitted via a different data connection with dotted lines.

More specifically, the following steps are carried out:
The central control unit 10 generates an instruction A.1 which specifies the network segment to be modified, the device to be controlled (here the first consumer assembly 4.1) of this network segment and the action to be performed (here: open or close hatch 4.2).

The central control unit 10 sends this instruction A.1 onto the data bus and therefore onto the control unit-fieldbus data connection 21.1. The fieldbus master 11 recognizes that the instruction A.1 is intended for "its" network segment.

The fieldbus master 11 generates a fieldbus instruction A.2 in response to receiving the instruction A.1. This fieldbus instruction A.2 contains an identifier of the device 4.2 to be controlled and an identifier of the action to be performed.

The fieldbus command A.2 is transmitted via the first fieldbus-head station data connection 21.2 which is designed as a fieldbus connection to the PLC coordinator 16.1.

The PLC coordinator 16.1 converts the received fieldbus instruction A.2 into a fieldbus instruction signal A.3 which can be transmitted via the power supply network by means of PLC. The fieldbus command signal A.3 is, for example, modulated onto the transmitted AC current.

The fieldbus instruction signal A.3 is transmitted via the first head station-power line data connection 21.4, the first part 20.1 of the power supply network and the first coupling module-power line data connection 21.10 to the first PLC client 14.1 of the coupling module 4.4. These three connections 21.4, 20.1, 21.10 provide a continuous fieldbus connection, i.e. a connection which is "transparent" to the fieldbus system.

The PLC client 14.1 reconstructs the fieldbus instruction A.2 once more from the received fieldbus instruction signal A.3.

The reconstructed fieldbus instruction A.2 is transmitted via the first coupling module-fieldbus data connection 21.6 which is arranged in the first coupling module 4.4 from the first PLC client 14.1 to the fieldbus slave 15.1.

The fieldbus slave 15.1 reconstructs the original instruction A.1 from the fieldbus instruction A.2 for the local control unit 4.5.

The reconstructed instruction A.1 is transmitted via the first slave-consumer data connection 21.7 which is similarly arranged in the first coupling module 4.4 to the local control unit 4.5.

The local control unit 4.5 generates a device-specific instruction A.4 depending on the received instruction A.1 and controls the drive mechanism 4.3 according to the generated device-specific instruction A.4.

The controlled drive mechanism 4.3 adjusts the hatch 4.2.

In response, the drive mechanism 4.3 or a position sensor for the hatch 4.2 generates a device-specific message M.4 in the form of a device-specific status message or acknowledgement.

The local control unit 4.5 generates a message M.1 for the central control unit 10 depending on the device-specific message M.4.

This message M.1 is transmitted via the first slave-consumer data connection 21.7 to the first fieldbus slave 15.1.

The first fieldbus slave 15.1 generates a fieldbus message M.2 which comprises an identifier of the control device 4.2 and an identifier of the message from the message M.1.

This fieldbus message M.2 is transmitted via the first coupling module-fieldbus data connection 21.6 to the PLC client 14.1.

The PLC client 14.1 generates a fieldbus message signal M.3 which can be transmitted by means of PLC via a power supply network from the received fieldbus message M.2. This fieldbus message signal M.3 is transmitted via the first coupling module-power line data connection 21.10, the first part 20.1 of the power supply network and the first head station-power line data connection 21.4 to the first PLC coordinator 16.1.

The first PLC coordinator 16.1 reconstructs the fieldbus message M.2 once more from the fieldbus message signal M.3.

The reconstructed fieldbus message M.2 is transmitted via the first fieldbus-head station data connection 21.2 from the first PLC coordinator 16.1 to the fieldbus master 11.

The fieldbus master 11 receives the fieldbus message M.2 and reconstructs the original message M.1 from the fieldbus message M.2.

The reconstructed message M.1 is transmitted via the control unit-fieldbus data connection 21.1 to the central control unit 10.

As already explained, two redundant head stations 3.1, 3.2 are responsible for one network segment having a plurality of controllable electrical consumers. Each head station 3.1, 3.2 is capable on its own of performing the required steps for the network segment. In one design, each head station 3.1, 3.2 in each case comprises one PLC coordinator 16.1, 16.2 and, for each connected electrical consumer—or more precisely: for each connected fieldbus slave—in each case one PLC client 14.1, 14.2. The PLC coordinator 16.1, 16.2 is connected at least temporarily to each PLC client of the network segment during fault-free operation. During the initialization, each connected PLC client dials in to the PLC coordinator 16.1 or 16.2 and thereby registers automatically so that a data exchange is possible.

In one design, the PLC coordinator 16.1, 16.2 is subdivided into a PLC control unit 12.1, 12.2 and a PLC modem 13.1, 13.2. The PLC modem 13.1, 13.2 implements a chipset which provides basic data transmission functions. The PLC control unit 12.1, 12.2 implements all further functions and acts as a control unit for the PLC modem 13.1, 13.2.

FIG. 1 shows a circuit diagram for a section of the network, wherein the section comprises a central control unit, two head stations, two coupling modules and two consumer modules;

shows the data exchange which is carried out during the initialization and during the operation of the PLC coordinator 16.1. The PLC control unit 12.1 is shown on the left, the PLC modem 13.1 on the right. The signals T.1 to T.4 are exchanged during the initialization, the signal T.5 during ongoing operation, also repeatedly if required. The signals have the following meaning:

The PLC control unit 12.1 transmits an activation signal T.1 to the PLC modem 13.1. The PLC modem 13.1 registers the activities on the network segment (arrow CA—Channel Assessment), and the PLC modem 13.1 transmits an acknowledgement signal T.2 to the PLC control unit 12.1.

The PLC control unit 12.1 transmits a command signal T.3 to the PLC modem 13.1 so that the latter sets up a Personal Area Network (PAN) with the fieldbus slaves of the network segment. The PLC modem 13.1 then transmits signals to the PLC clients which forward these signals to the fieldbus slaves. The fieldbus slaves cause the PLC clients 14.1, 14.2 to register automatically with the PLC modem 13.1. The PLC modem 13.1 establishes which PLC clients 14.1, 14.2 have registered with the PLC modem 13.1. The PLC modem 13.1 transmits an acknowledgement signal T.4 with identifiers of the registered PLC clients to the PLC control unit 12.1.

If required, or periodically at a fixed rate, the PLC control unit 12.1 transmits a signal T.5 to the PLC modem 13.1 during ongoing operation in order to query, modify or otherwise manage at least one network parameter in a PLC client 14.1, 14.2.

Figure 3:
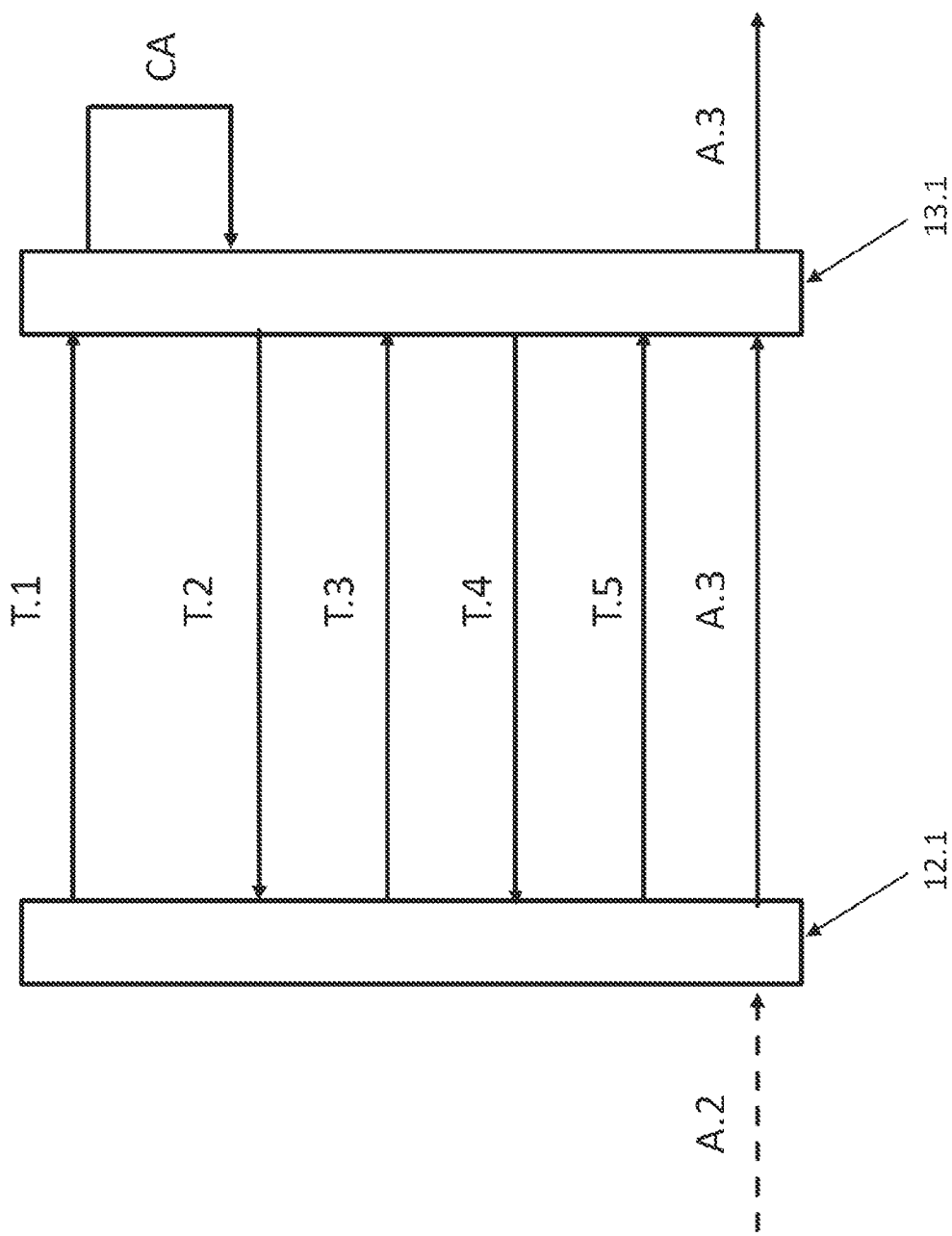
FIG. 3 is a signal flow diagram showing the signal flows within a first PLC coordinator.

The PLC control unit 12.1 receives a fieldbus command A.2 and converts it into a fieldbus command signal A.3 which can be transmitted by means of PLC via a power connection. (As shown in FIG. 3) The PLC modem 13.1 transmits this to the specified PLC client 14.1, 14.2.

The PLC control unit 12.1, 12.2 periodically causes the PLC modem 13.1, 13.2 to measure the activities in the PLC network of the network segment. The PLC modem 13.1, 13.2 transmits status messages to the PLC control unit 12.1, 12.2. If the PLC control unit 12.1, 12.2 is not notified of any activity, the PLC control unit 12.1, 12.2 initiates the attempt to set up a network once more with the PLC clients of the network segment. Each PLC client receives an activation command and the PLC modem registers the PLC client in the PLC network.

Figure 2:
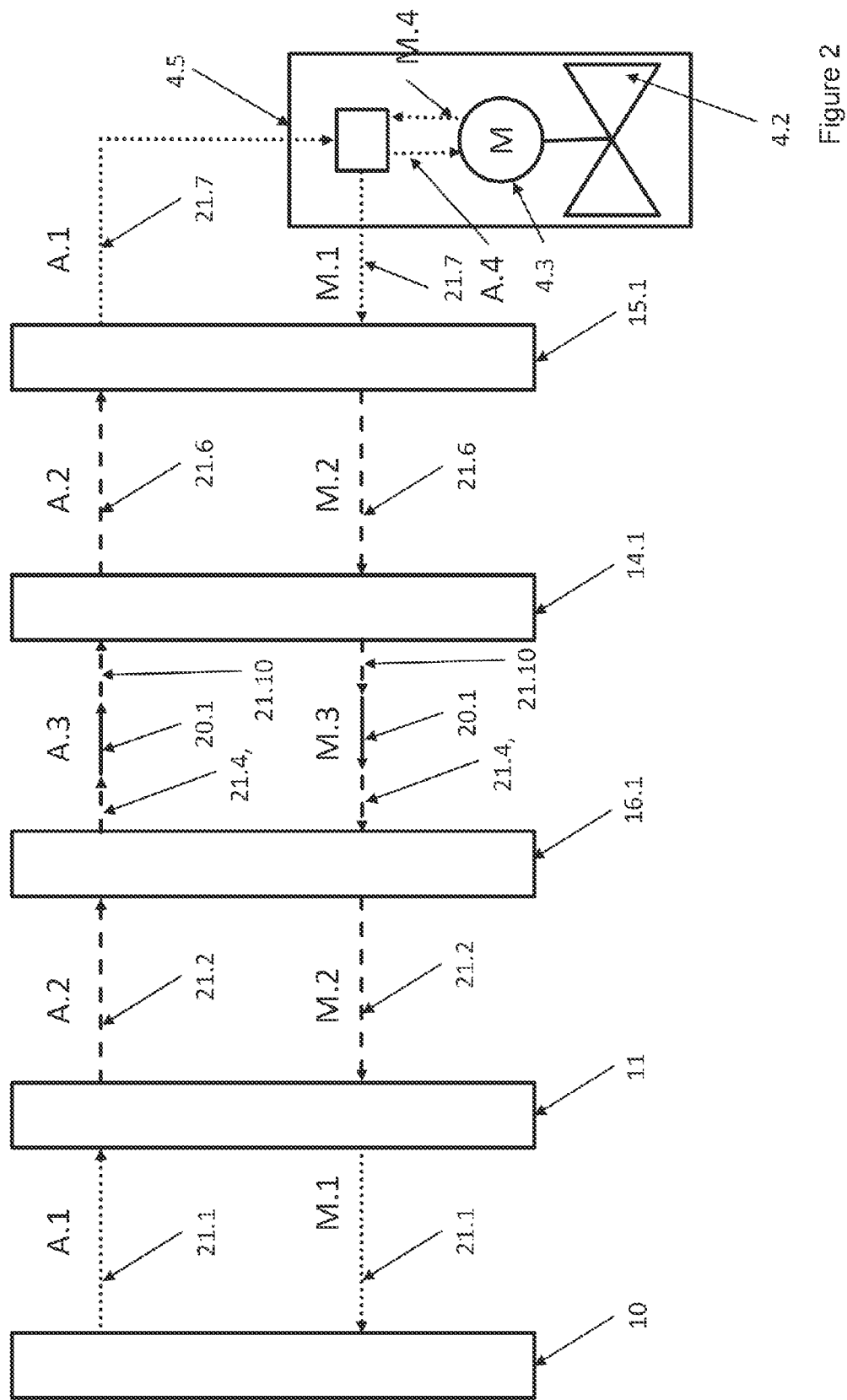
FIG. 2 is a signal flow diagram illustrating transmission of an instruction from a central control unit to a first consumer module and transmission of a message from the first consumer module to the central control unit.

FIG. 2 is a signal flow diagram illustrating the transmission of an instruction from the central control unit to the first consumer module and the transmission of a message from the first consumer module to the central control unit;

shows a state transition diagram for the PLC components which perform the data transmission for a network segment, having the states described below. The diagram relates to two parallel head stations 3.1, 3.2, each having one PLC coordinator 16.1, 16.2 and a plurality of PLC clients 14.1, 14.2. The following states are attained:

State Z.1 ("offline or device error"): Both PLC coordinators 16.1, 16.2 and the PLC clients 14.1, 14.2 are inactive, e.g. are switched off or have failed. Data transmission is not possible.

If the fieldbus system and at least one PLC coordinator are operational, a transition to state Z.2 is possible (transition Ü.1).

State Z.2 ("Coordinator setup"): one PLC coordinator 16.1, 16.2 is now being switched to the active state. If both PLC coordinators 16.1 and 16.2 are operational, one PLC coordinator 16.1, 16.2 is selected in accordance with a predefined selection rule, e.g. depending on the previous usage period, its own temperature or the ambient temperature or the position on board the watercraft. If only one PLC coordinator is operational, this PLC coordinator is selected. In the following example, the PLC coordinator 16.1 is activated. The PLC clients are not yet connected and data transmission is not possible. If both PLC coordinators 16.1, 16.2 are not operational, a transition takes place to state Z.1 (transition Ü.10).

As soon as the only operational or the selected PLC coordinator 16.1 is active and is e.g. "booted up", a transition takes place to state Z.3 (transition Ü.2).

State Z.3 ("Client setup"): One PLC coordinator 16.1 is active. The PLC clients dial in to the PLC network. Data communication is not yet possible.

If the PLC clients have dialed in successfully and the other PLC coordinator 16.2 is similarly operational, i.e. is on standby, the method continues in state Z.4 (transition Ü.3).

If the PLC clients have dialed in, but the other PLC coordinator 16.2 is not operational, the method continues in state Z.5 (transition Ü.4).

If the PLC clients were unable to dial in, the method continues in state Z.6 (transition Ü.5).

State Z.4 ("normal"): All PLC clients are connected to the active PLC coordinator 16.1. The other PLC coordinator 16.2 is operational and on standby. Data can be exchanged between the fieldbus master 11 and each fieldbus slave 15.1, 15.2 of the network segment, in fact via the active PLC coordinator 16.1 and the respective PLC client 14.1, 14.2.

State Z.5 ("at risk"): Since the inactive PLC coordinator 16.2 has failed, redundancy is no longer provided. As long as the active PLC coordinator 16.1 remains operational, data transmission is possible as in state Z.4. If the active PLC coordinator 16.1 then also fails, this network segment switches to state Z.1 (transition Ü.11)

State Z.6 ("Network fault"): The PLC clients cannot dial in to the PLC network, even though at least one PLC coordinator 16.1 is operational and active. The other PLC coordinator 16.2 may have failed or may similarly be operational. Data cannot be transmitted in state Z.6.

The PLC network can switch to state Z.7, i.e. if one PLC coordinator has failed and the other PLC coordinator is operational.

State Z.7 ("PLC coordinators in transition"): In this state, the previously active PLC coordinator 16.1 has failed (transition Ü.6 from state Z.4). The other PLC coordinator 16.2 is operational and is now being started (Setup). The PLC clients are not yet in the PLC network. Data cannot be transmitted.

Figure 4:
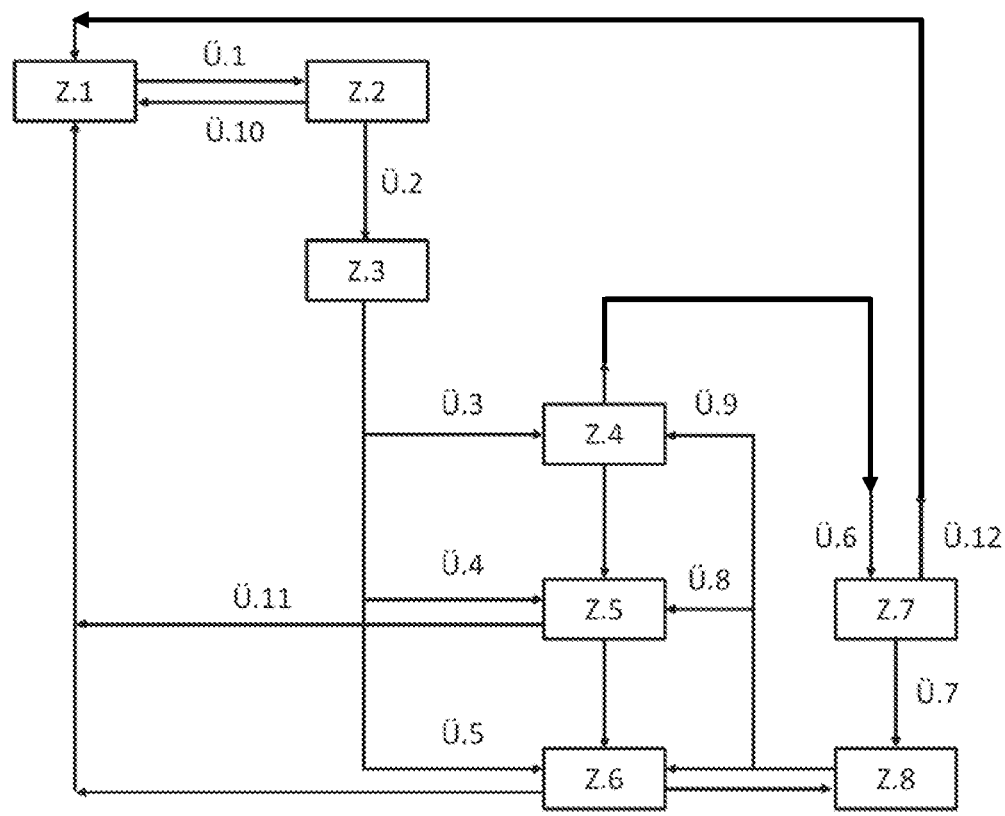
FIG. 4 is a state transition diagram for two parallel head stations.

As soon as the other PLC coordinator 16.2 is active, the method continues in state Z.8 (transition Ü.7). If the other PLC coordinator 16.2 cannot be activated, the method continues in state Z.1 (transition Ü.12) (As shown in FIG. 4).

State Z.8 ("Clients in transition"): In this state, the operational PLC coordinator 16.2 is activated. The PLC clients dial in to the PLC network that has now been formed. If this is possible, the method continues in state Z.5, i.e. the failed PLC coordinator 16.1 remains failed (transition Ü.8) or in state Z.4 (the failed PLC coordinator 16.1 becomes operational once more (transition Ü.9). Data cannot yet be transmitted in state Z.8.

In the example embodiment, the two parallel head stations 3.1 and 3.2 operate autonomously, i.e. independently from commands of a higher-level control unit 10. In one design, at least one local control unit is assigned to the head stations 3.1 and 3.2. A data connection exists, for example, between the same control unit and both head stations 3.1 and 3.2. Alternatively, each head station 3.1 and 3.2 has its own local control unit, preferably the PLC control unit 12.1, 12.2 of the PLC coordinator 16.1, 16.2. Each PLC control unit 12.1, 12.2 preferably has a data connection to the other PLC control unit 12.2, 12.1 and is capable of establishing whether the other head station and therefore the other PLC control unit 12.2, 12.1 is operational and does or does not respond to a query.

In both designs, the or each local control unit is capable of establishing the states which are shown in the state transition diagram from FIG. 2 is a signal flow diagram illustrating the transmission of an instruction from the central control unit to the first consumer module and the transmission of a message from the first consumer module to the central control unit;

and is capable of effecting the indicated state transitions automatically and without a higher-level controller. In one design, each PLC control unit 12.1, 12.2 is capable of detecting the states and effecting these state transitions independently from the other PLC control unit 12.2, 12.1. As a result, in particular, following a failure of one head station 4.1, the other head station 4.2 quickly takes over the tasks of the failed head station 4.1.

REFERENCE NUMBERS

| | |
|---|---|
| 1.1, 1.2 | on-board voltage sources, supply the consumer modules 4.1, 5.1 with AC current and the central control unit 10 and the data connection system devices with DC current |
| 2.1 | first DC voltage converter, converts DC voltage from the voltage source 1.2 |
| 2.2 | second voltage converter, converts DC voltage into AC current at 115 V/230 V and 60 Hz |

| | |
|---|---|
| 2.3 | third DC voltage converter, converts DC voltage into DC voltage at 24 V |
| 3.1. 3.2 | /parallel head stations, comprise one PLC coordinator 16.1, 16.2 having one PLC control unit 12.1, 12.2 and one PLC modem 13.1, 13.2 |
| 4.1 | first consumer assembly, comprises the hatch 4.2, the drive mechanism 4.3, the first coupling module 4.4 and the first local control unit 4.5 |
| 4.2 | hatch, belongs to the first consumer assembly 4.1 |
| 4.3 | electrically driven drive mechanism for the hatch 4.2 |
| 4.4 | coupling module of the first consumer assembly 4.1, comprises the PLC control unit 12.1 and the PLC modem 13.1 |
| 4.5 | local control unit of the first consumer assembly 4.1, controls the drive mechanism 4.3 |
| 5.1 | second consumer assembly, comprises the signal lamp 5.2, the second coupling module 4.3 and the second local control unit 5.4 |
| 5.2 | signal lamp, belongs to the second consumer assembly 4.2 |
| 5.3 | coupling module of the second consumer assembly 4.2, comprises the PLC control unit 12.2 and the PLC modem 13.2 |
| 10 | central control unit, responsible for a plurality of network segments, generates the instruction Al, processes the message M.1 |
| 11 | fieldbus master, responsible for one network segment |
| 12.1, 12.2 | PLC control unit of the PLC coordinator 16.1, 16.2 of the head station 3.1, 3.2 |
| 13.1, 13.2 | PLC modem of the PLC coordinator 16.1, 16.2 of the head station 3.1, 3.2 |
| 14.1, 14.2 | PLC client of the coupling module 4.4, 5.3 |
| 15.1, 15.2 | fieldbus slave of the coupling module 4.4, 5.3 |
| 16.1, 16.2 | PLC coordinator of the head station 3.1, 3.2, comprises the PLC control unit 12.1, 12.2 and the PLC modem 13.1, 13.2 |
| 20.1 | first part of the power supply network, supplies electrical consumers with 115 V/230 V and 60 Hz AC current |
| 20.2 | second part of the power supply network, supplies the central control unit 10 and data connection system devices with 24 V DC current |
| 21.1 | control unit-fieldbus data connection, connects the central control unit 10 to the fieldbus master 11 |
| 21.2 | first fieldbus-head station data connection, connects the fieldbus master 11 to the first PLC coordinator 16.1, designed as a fieldbus connection |
| 21.3 | second fieldbus-head station data connection, connects the fieldbus master 11 to the second PLC coordinator 16.2, designed as a fieldbus connection |
| 21.4 | first head station-power line data connection, connects the first PLC coordinator 16.1 to the first part 20.1 of the power supply network, designed as a fieldbus connection |
| 21.5 | second head station-power line data connection, connects the second PLC coordinator 16.2 to the first part 20.1 of the power supply network, designed as a fieldbus connection |
| 21.6 | first coupling module-fieldbus data connection, connects the first PLC client 14.1 to the first fieldbus slave 15.1, designed as a fieldbus connection |
| 21.7 | first slave-consumer data connection, connects the first fieldbus slave 15.1 to the first local control unit 4.5, designed as a fieldbus connection |
| 21.8 | second coupling module-fieldbus data connection, connects the second PLC client 14.2 to the second fieldbus slave 15.2, designed as a fieldbus connection |
| 21.9 | second slave-consumer data connection, connects the second fieldbus slave 15.2 to the second local control unit 5.4 |
| 21.10 | first coupling module-power line data connection, connects the first PLC client 14.1 to the first part 20.1 of the power supply network, designed as a fieldbus connection |
| 21.11 | second coupling module-power line data connection, connects the second PLC client 14.2 to the first part 20.1 of the power supply network, designed as a fieldbus connection |
| A.1 | instruction generated by the central control unit 10, specifies the network segment to be modified, the device to be controlled (first consumer assembly 4.1) of this network segment and the action to be performed (adjust hatch 4.2) |
| A.2 | fieldbus instruction, generated by the fieldbus master 11 in response to receiving the instruction A.1 |
| A.3 | fieldbus instruction signal which can be transmitted by means of PLC via a power line, generated by the PLC coordinator 16.1 in response to receiving the fieldbus instruction A.2 |
| A.4 | device-specific instruction for the local control unit 4.5, generated by the fieldbus slave 15.1 in response to receiving the fieldbus instruction signal A.3 |
| M.1 | device-specific message in the form of a status message or acknowledgement, generated by the local control unit 4.5 following adjustment of the hatch 4.2 |
| M.2 | fieldbus message, generated by the fieldbus slave 15.1 in response to receiving the message M.1 |
| M.3 | fieldbus message signal which can be transmitted by means of PLC via a power line, generated by the PLC client 14.1 in response to receiving the fieldbus message M.2 |

| | |
|---|---|
| M.4 | message for the central control unit 10, generated by the fieldbus master 11 in response to receiving the fieldbus message M.2 |
| T.1 | activation signal, transmitted from the PLC control unit 12.1 to the PLC modem 13.1 |
| T.2 | acknowledgement signal, transmitted from the PLC modem 13.1 to the PLC control unit 12.1 |
| T.3 | command signal, transmitted from the PLC control unit 12.1 to the PLC modem 13.1 so that the latter sets up a Personal Area Network (PAN) with the fieldbus slaves 15.1, 15.2 of the network segment |
| T.4 | acknowledgement signal, transmitted from the PLC modem 13.1 to the PLC control unit 12.1, comprises identifiers of the registered PLC clients 14.1, 14.2 |
| T.5 | signal, transmitted from the PLC control unit 12.1 to the PLC modem 13.1 in order to modify at least one network parameter in a PLC client 14.1, 14.2 |
| Z.1 | "offline or device fault" state: PLC coordinators 16.1, 16.2 and PLC clients 14.1, 14.2 inactive |
| Z.2 | "Coordinator setup" state: One PLC coordinator 16.1, 16.2 is now being switched to the active state. |
| Z.3 | "Client setup" state: One PLC coordinator 16.1 is active. The PLC clients dial in to the PLC network. |
| Z.4 | "normal" state: All PLC clients are connected to the active PLC coordinator. The other PLC coordinator is operational and on standby. |
| Z.5 | "at risk" state: active PLC coordinator operational, inactive PLC coordinator failed |
| Z.6 | "Network fault" state: One PLC coordinator is active. The PLC clients cannot dial in to the PLC network. |
| Z.7 | "PLC coordinators in transition" state: the previously active PLC coordinator has failed. The other PLC coordinator is operational and is now being started. |
| Z.8 | "Clients in transition" state: operational PLC coordinator is activated. The PLC clients dial in to the PLC network. |

What is claimed is:

1. A watercraft comprising:
   a first controllable electrical consumer module configured to process an instruction;
   a central control unit configured to generate the instruction for the first controllable electrical consumer module;
   a power supply network configured to supply electricity to the first controllable electrical consumer module; and
   a data connection system including
      a first head station,
      a first coupling module,
      a first control unit-head station data connection between the central control unit and the first head station, wherein the first head station is configured to convert the instruction that is transmitted via the first control unit-head station data connection into an instruction signal that is transmittable via the power supply network,
      a first head station-power line data connection between the first head station and the power supply network,
      a first coupling module-power line data connection between the first coupling module and the power supply network, and
      a first coupling module-consumer data connection between the first coupling module and the first controllable electrical consumer module,
      wherein the first coupling module is configured to convert the instruction signal transmitted via the power supply network into the instruction that is transmittable via one or more of the data connections,
      wherein the watercraft is configured to transmit:
         the instruction from the central control unit via the first control unit-head station data connection to the first head station,
         the instruction as the instruction signal from the first head station via the first head station-power line data connection, the power supply network, and the first coupling module-power line data connection to the first coupling module, and
         the instruction from the first coupling module via the first coupling module-consumer data connection to the first controllable electrical consumer module.

2. The watercraft of claim 1 wherein the first controllable electrical consumer module is configured to generate a message for the central control unit, wherein the central control unit is configured to process the message, wherein the first coupling module is configured to convert the message that is transmitted via the first control unit-head station data connection to the first coupling module into a message signal that is transmittable via the power supply network, wherein the first head station is configured to convert the message signal transmitted via the power supply network into the message that is transmittable via one of the data connections, wherein the watercraft is configured to transmit the message:
   from the first controllable electrical consumer module via the first coupling module-consumer data connection to the first coupling module;
   as the message signal from the first coupling module via the first coupling module-power line data connection, the power supply network, and the first head station-power line data connection to the first head station; and
   from the first head station via the first control unit-head station data connection to the central control unit.

3. The watercraft of claim 1 wherein the data connection system comprises:
   a second head station arranged parallel to the first head station, wherein the second head station is configured to convert the instruction that is transmitted via one of the data connections to the second head station into the instruction signal that is transmittable via the power supply network;

a second control unit-head station data connection between the central control unit and the second head station, and a second head station-power line data connection between the second head station and the power supply network, wherein the watercraft is configured to transmit:

the instruction from the central control unit via the second control unit-head station data connection to the second head station, and the instruction as the instruction signal from the second head station via the second head station-power line data connection, the power supply network, and the first coupling module-power line data connection to the first coupling module.

4. The watercraft of claim 3 wherein the data connection system comprises a data connection control unit configured to:

select and activate one of the head stations if both the first head station and the second head station are operational;

activate the first head station if the second head station has failed or activate the second head station if the first head station has failed; and set up a first data connection between the central control unit and the first controllable electrical consumer module by incorporating the power supply network, the activated respective head station, and the first coupling module.

5. The watercraft of claim 4 wherein the data connection control unit is configured to activate the other head station if the activated head station fails after the first data connection is set up; and set up a second data connection between the central control unit and the first controllable electrical consumer module by incorporating the power supply network, the activated other head station, and the first coupling module.

6. The watercraft of claim 4 wherein the first head station comprises a first data connection control unit and the second head station comprises a second data connection control unit, wherein each data connection control unit is configured:

to activate the respective head station; and to set up a first data connection between the central control unit and the first controllable electrical consumer module by incorporating the power supply network, the respective activated head station, and the first coupling module.

7. The watercraft of claim 1 comprising a second controllable electrical consumer module, wherein the data connection system comprises:

a second coupling module;

a second coupling module-power line data connection between the second coupling module and the power supply network; and a second coupling module-consumer data connection between the second coupling module and the second electrical consumer module, wherein the second coupling module is configured to convert the instruction signal transmitted via the power supply network into the instruction that is transmittable via one of the data connections, wherein the central control unit is configured to generate an instruction automatically for the second controllable electrical consumer module, wherein the second controllable electrical consumer module is configured to process a received instruction automatically, wherein the watercraft is configured to transmit:

the instruction from the central control unit via the first control unit-head station data connection to the first head station;

to transmit the instruction as the instruction signal from the first head station via the first head station-power line data connection, the power supply network, and the second coupling module-power line data connection to the second controllable electrical consumer module, and to transmit the instruction from the second coupling module via the second coupling module-consumer data connection to the second controllable electrical consumer module.

8. The watercraft of claim 1 wherein the first controllable electrical consumer module and the first coupling module are configured as components of a first assembly, wherein the first assembly is detachably connected to the power supply network.

9. The watercraft of claim 1 wherein the first controllable electrical consumer module comprises a local control unit and a first electrical consumer, wherein the first coupling module-consumer data connection connects the first coupling module to the local control unit, wherein the local control unit is configured to control the first electrical consumer depending on the instruction from the central control unit.

10. The watercraft of claim 1:

wherein the data connection system comprises:

a fieldbus master, and a first fieldbus slave;

wherein the first control unit-head station data connection comprises:

a control unit-fieldbus data connection between the central control unit and the fieldbus master, and a first fieldbus-head station data connection between the fieldbus master and the first head station;

wherein the first coupling module-consumer data connection comprises:

a first coupling module-fieldbus data connection between the first coupling module and the first fieldbus slave, and a first slave-consumer data connection between the first fieldbus slave and the first controllable electrical consumer module;

wherein the control unit-fieldbus data connection, the first fieldbus-head station data connection, the first head station-power line data connection, a part of the power supply network, the first coupling module-power line data connection, and the first coupling module-fieldbus data connection together provide a fieldbus connection between the fieldbus master and the first fieldbus slave;

wherein the fieldbus master is configured to convert the instruction transmitted via a data connection into a fieldbus instruction;

wherein the first fieldbus slave is configured to convert the transmitted fieldbus instruction into the instruction transmittable via one of the data connections;

wherein the watercraft is configured to transmit:

the instruction from the central control unit via the control unit-fieldbus data connection to the fieldbus master, the instruction as the fieldbus instruction via the provided fieldbus connection from the fieldbus master to the first fieldbus slave, and the instruction from the first fieldbus slave via the first slave-consumer data connection to the first controllable electrical consumer module.

11. The watercraft of claim 10 wherein the first controllable electrical consumer module, the first coupling module, and the first fieldbus slave are configured as components of a first assembly, wherein the first assembly is detachably connected to the power supply network.

12. The watercraft of claim 10 wherein the first fieldbus slave is integrated into the first coupling module.

13. The watercraft of claim 1 comprising a voltage source that:
is electrically connected to the power supply network; and
is configured to supply electricity to the first controllable electrical consumer module and to the central control unit, the first head station, and the first coupling module via the power supply network.

14. The watercraft of claim 1 comprising a first energy storage device configured to supply electricity to the first coupling module, the first energy storage device being assigned to the first controllable electrical consumer module.

15. A method for transmitting an instruction from a central control unit to a first controllable electrical consumer module, with the method being performed on a watercraft that comprises the central control unit, a first consumer module, a power supply network, and a data connection system that comprises:
a first head station;
a first coupling module;
a first control unit-head station data connection between the central control unit and the first head station;
a first head station-power line data connection between the first head station and the power supply network;
a first coupling module-power line data connection between the first coupling module and the power supply network; and
a first coupling module-consumer data connection between the first coupling module and the first consumer module,
wherein the method comprises:
supplying electricity to the first consumer module by way of the power supply network;
automatically generating with the central control unit the instruction that is transmitted to the first consumer module, wherein transmitting the instruction from the central control unit to the first consumer module comprises:
transmitting the instruction from the central control unit via the first control unit-head station data connection to the first head station,
converting with the first head station the received instruction into an instruction signal that is transmittable via the power supply network,
transmitting the instruction signal from the first head station via the first head station-power line data connection, the power supply network, and the first coupling module-power line data connection to the first coupling module, reconstructing with the first coupling module the instruction from the transmitted instruction signal such that the instruction is transmittable via a data connection, and
transmitting the reconstructed instruction from the first coupling module via the first coupling module-consumer data connection to the first consumer module; and
automatically processing with the first consumer module the instruction that has been received.

16. The method of claim 15
wherein the data connection system comprises:
a fieldbus master, and
a first fieldbus slave;
wherein the first control unit-head station data connection comprises:
a control unit-fieldbus data connection between the central control unit and the fieldbus master, and
a first fieldbus-head station data connection between the fieldbus master and the first head station;
wherein the first coupling module-consumer data connection comprises:
a first coupling module-fieldbus data connection between the first coupling module and the first fieldbus slave, and
a first slave-consumer data connection between the first fieldbus slave and the first consumer module,
wherein the control unit-fieldbus data connection, the first fieldbus-head station data connection, the first head station-power line data connection, a part of the power supply network, the first coupling module-power line data connection, and the first coupling module-fieldbus data connection together provide a fieldbus connection between the fieldbus master and the first fieldbus slave,
wherein transmitting the instruction from the central control unit to the first consumer module comprises:
transmitting the instruction from the central control unit to the fieldbus master,
converting with the fieldbus master the instruction into a fieldbus instruction,
transmitting the fieldbus instruction via a part of the fieldbus connection to the first head station,
converting with the first head station the received fieldbus instruction into a fieldbus instruction signal that is transmittable via the power supply network,
transmitting the fieldbus instruction signal from the first head station to the first coupling module via the part of the fieldbus connection belonging to the power supply network,
converting with the first coupling module the fieldbus instruction signal received via the power supply network into the fieldbus instruction transmittable via one of the data connections,
transmitting the fieldbus instruction via the part of the fieldbus connection to the first fieldbus slave,
converting with the first fieldbus slave the fieldbus instruction into the instruction that is transmittable via one of the data connections, and
transmitting the instruction from the first fieldbus slave via the first slave-consumer data connection to the first controllable electrical consumer module.

* * * * *